(12) United States Patent
Jang et al.

(10) Patent No.: US 8,441,594 B2
(45) Date of Patent: May 14, 2013

(54) LIQUID CRYSTAL DISPLAY DEVICE HAVING IMPROVED END REINFORCING STRUCTURE OF A CHASSIS SURROUNDING A MOLD FRAME

(75) Inventors: Nam-Jin Jang, Yongin (KR); Young-Min You, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 236 days.

(21) Appl. No.: 13/069,760

(22) Filed: Mar. 23, 2011

(65) Prior Publication Data
US 2012/0127390 A1    May 24, 2012

(30) Foreign Application Priority Data
Nov. 22, 2010  (KR) .................. 10-2010-0116214

(51) Int. Cl.
G02F 1/1333    (2006.01)
(52) U.S. Cl.
USPC ............................................ 349/58; 349/60
(58) Field of Classification Search .............. 349/58, 349/60
See application file for complete search history.

(56) References Cited

U.S. PATENT DOCUMENTS

| 7,775,701 | B2 * | 8/2010 | Lee et al. | 362/633 |
| 7,826,206 | B2 * | 11/2010 | Woo | 361/679.05 |
| 2012/0014137 | A1 * | 1/2012 | Yu | 362/632 |

FOREIGN PATENT DOCUMENTS

| JP | 07-101356 | 4/1995 |
| JP | 08-103835 | 4/1996 |
| KR | 1998-048790 | 10/1998 |
| KR | 10-2004-0101820 | 12/2004 |
| KR | 10-2006-0041481 | 5/2006 |
| KR | 10-2010-0025407 | 3/2010 |

* cited by examiner

Primary Examiner — Mike Qi
(74) Attorney, Agent, or Firm — Robert E. Bushnell, Esq.

(57) ABSTRACT

A liquid crystal display device has an improved end reinforcing structure of a chassis. The liquid crystal display device comprises: a liquid crystal panel for realizing an image; a backlight unit for irradiating a backlight on the liquid crystal panel; a mold frame for storing the backlight unit; a first chassis for supporting the mold frame and including a hemming processor which is bent at an end of the first chassis so as to have a double thickness; and a reinforcing member installed so that the thickness of the hemming processor is increased. Accordingly, the intensity of the end of the first chassis may be increased, thereby guaranteeing strong durability against an external shock.

10 Claims, 3 Drawing Sheets

LIQUID CRYSTAL DISPLAY DEVICE HAVING IMPROVED END REINFORCING STRUCTURE OF A CHASSIS SURROUNDING A MOLD FRAME

CLAIM OF PRIORITY

This application makes reference to, incorporates the same herein, and claims all benefits accruing under 35 U.S.C. §119 from an application earlier filed in the Korean Intellectual Property Office on Nov. 22, 2010 and there duly assigned Ser. No. 10-2010-0116214.

BACKGROUND OF THE INVENTION

1. Field of the Invention

The present invention relates to a liquid crystal display device, and more particularly, to a liquid crystal display device having an improved end reinforcing structure of a chassis.

2. Description of the Related Art

Generally, a liquid crystal display (LCD) is a flat panel display device for displaying an image by adjusting a penetration amount of a light beam according to an image signal. Specifically, the range of application of the LCD is gradually increasing since the LCD is light, thin, and has low power consumption.

Recently, a thinner and stronger LCD is required considering the need for easy portability, and thus, an LCD in which an external frame is formed of a thin chassis, wherein an end of the thin chassis is bent via a hemming process, is preferred. In other words, the LCD is slimmed by forming the external frame with a thin chassis, the end of which is bent via the hemming process so that the end has a double thickness. Accordingly, the strength of the end is somewhat reinforced, but may specifically weaken due to shock.

That is, the intensity may not be sufficiently reinforced due to a gap in the bent portion having the double thickness when the hemming process is performed. In other words, the bent portion may not be able to cope with an applied external force due to the gap. Accordingly, a stronger structure is required for the bent portion of the chassis.

SUMMARY OF THE INVENTION

The present invention provides a liquid crystal display device having an improved end reinforcing structure of a chassis surrounding a mold frame.

According to an aspect of the present invention, a liquid crystal display device comprises: a liquid crystal panel for realizing an image; a backlight unit for irradiating a backlight on the liquid crystal panel; a mold frame for storing the backlight unit; a first chassis for supporting the mold frame and including a hemming processor which is bent at an end of the first chassis so as to have a double thickness; and a reinforcing member installed so that a thickness of the hemming processor is increased.

The reinforcing member may be inserted into a gap between the double thickness of the bent hemming processor.

The reinforcing member may comprise the same material as the first chassis.

The liquid crystal display device may further include a second chassis partially surrounding the hemming processor of the first chassis and the liquid crystal panel.

The first chassis may include a bottom unit for supporting the backlight unit, and a side unit perpendicularly bent from the bottom unit and including the hemming processor at an end, wherein the reinforcing member may be installed on the side unit.

A part of the reinforcing member may be disposed inside the gap of the hemming processor.

The reinforcing member may be adhered to the hemming processor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, the present invention will be described more fully with reference to the accompanying drawings, in which exemplary embodiments of the invention are shown.

Figure 1:
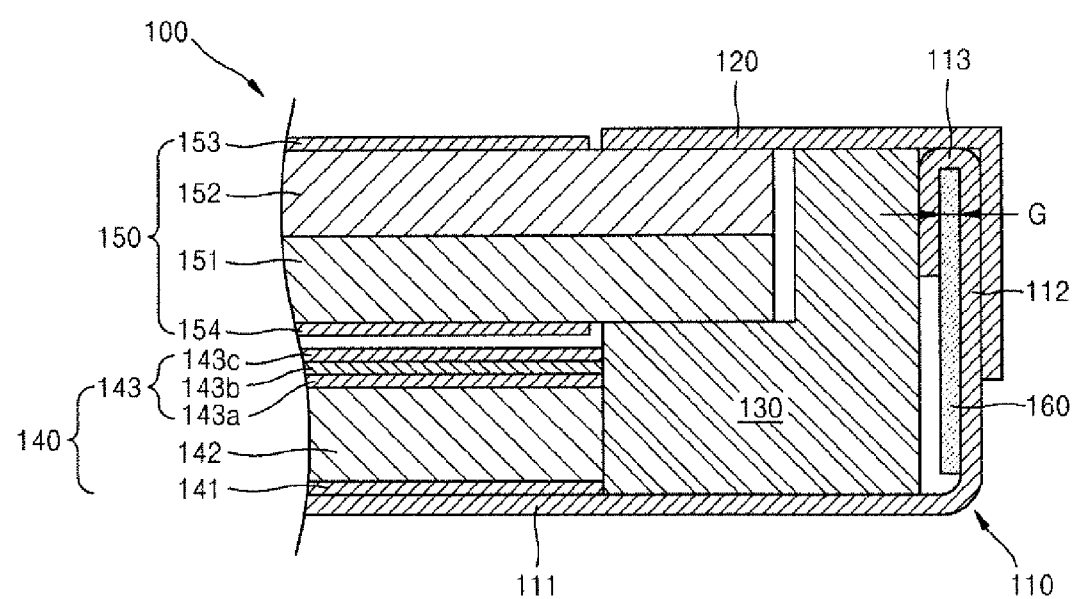
FIG. 1 is a cross-sectional view of a liquid crystal display device according to an embodiment of the present invention.

FIG. 1 is a cross-sectional view of a liquid crystal display device according to an embodiment of the present invention.

As shown in FIG. 1, the liquid crystal display device 100 includes a liquid crystal panel 150 for realizing an image, a backlight unit 140 for supplying light to the liquid crystal panel 150, a mold frame 130 for storing the backlight unit 140, and first and second chassis 110 and 120, respectively, for forming an external frame. The light supplied from the backlight unit 140 selectively penetrates through the liquid crystal panel 150, and thus an image is formed.

The backlight unit 140 includes a reflective sheet 141, a light guide plate 142, and an optical sheet 143.

The light guide plate 142 guides a light incident from a lamp (not shown) to the liquid crystal panel 150.

Also, the optical sheet 143 transmits the light emitted from the light guide plate 142 to the liquid crystal panel 150. The optical sheet 143 may include a diffusion sheet 143a for diffusing light, a prism sheet 143b for converting a proceeding angle of light so as to be perpendicular to the liquid crystal panel 150, and a protection sheet 143c for protecting a surface of the prism sheet 143b.

The reflective sheet 141 is disposed on a rear surface of the light guide plate 142, and reflects light emitted from a rear surface to the liquid crystal panel 150.

The liquid crystal panel 150 includes a thin film transistor substrate 151 and a color filter substrate 152, wherein a liquid crystal layer (not shown) is disposed therebetween, and polarizing plates 153 and 154 respectively disposed on the top of the color filter substrate 152 and on the bottom of the thin film transistor substrate 151.

The thin film transistor substrate 151 may include a thin film transistor (not shown) and a pixel electrode (not shown).

The color filter substrate 152 may include a color filter (not shown) for realizing a color, a black matrix (not shown) for preventing light from escaping, and a common electrode (not shown) facing the pixel electrode.

Also, the mold frame 130 stores the backlight unit 140 and supports a side of the liquid crystal panel 150, and the first and second chassis 110 and 120, respectively, are installed outside the mold frame 130.

The first chassis 110 includes a bottom unit 111 for supporting the bottom of the backlight unit 140, and a side unit 112 for supporting the side of the backlight unit 140.

The second chassis 120 covers and supports the side unit 112 of the first chassis 110 and part of the top of the liquid crystal panel 150.

A hemming processor 113 is formed at the end of the side unit 112 of the first chassis 110 by bending the end of the side unit 112 inward so as to increase the thickness of the hemming processor 113. In other words, the end of the first chassis 110 is bent so as to have a double thickness via a hemming process, and thus the intensity of the end, which may be weak, may be somewhat reinforced.

Since an empty space, i.e., a gap G, may be formed between the double thickness when the hemming processor 113 is formed, the intensity reinforcing effect may be decreased, and thus, a reinforcing member 160 is inserted into the gap G. In other words, by inserting the reinforcing member 160 into the gap G, the thickness of the side unit 112 may be increased by the thickness of the reinforcing member 160, and thus, the intensity is improved more than when the gap G remains as an empty space.

Figure 2A:
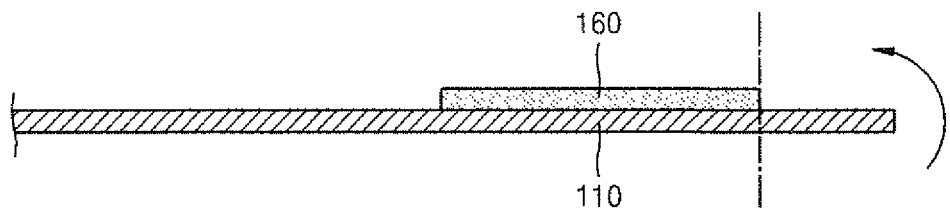
FIGS. 2A thru 2C are views for describing a process of forming a hemming processor of the liquid crystal display device of FIG. 1.
Figure 2B:
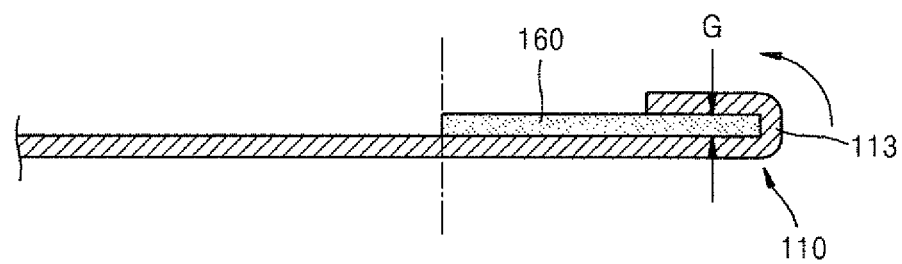
Figure 2C:
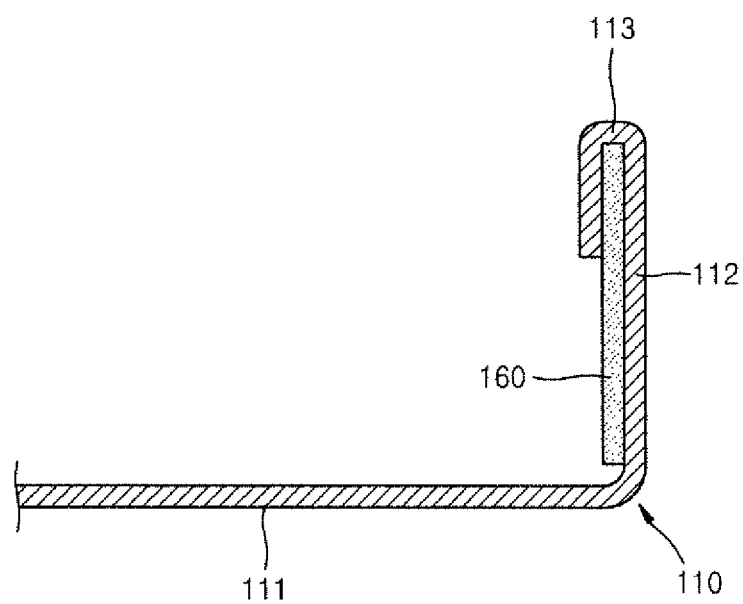

FIGS. 2A thru 2C are views for describing a process of forming a hemming processor of the liquid crystal display device of FIG. 1.

The reinforcing member 160 may be inserted as shown in FIGS. 2A thru 2C.

First, the reinforcing member 160 is placed at the end of the first chassis 110 as shown in FIG. 2A, and then the end is bent via the hemming process, as shown in FIG. 2B.

Accordingly, one end of the reinforcing member 160 is inserted into the gap G of the hemming processor 113 formed via the hemming process, as also shown in FIG. 2B.

In the latter regard, a portion of the first chassis 110, which is adjacent to another end of the reinforcing member 160, is bent so as to form the bottom unit 111 and the side unit 112 perpendicular to the bottom unit 111, as shown in FIG. 2C.

As such, the hemming processor 113, into which the reinforcing member 160 is inserted, is formed. Like the first and second chassis 110 and 120, respectively, the reinforcing member 160 may be formed of a metal, such as aluminum.

The liquid crystal display device 100, manufactured as such, may have improved intensity according to the increase in thickness by combining the side unit 112, which may be specifically weak against external shock to the hemming processor 113, and the reinforcing member 160.

Accordingly, the intensity of the end of the first chassis 110 which is hemming processed may be improved, thereby guaranteeing strong durability against external shock.

Figure 3:
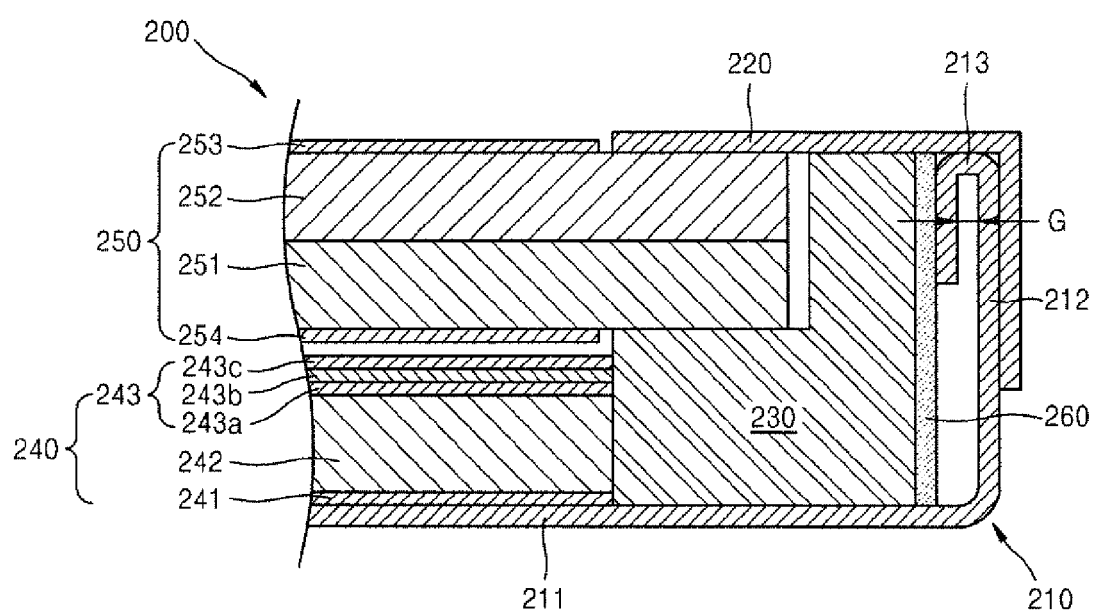
FIG. 3 is a cross-sectional view of a liquid crystal display device according to another embodiment of the present invention.

FIG. 3 is a cross-sectional view of a liquid crystal display device according to another embodiment of the present invention.

As shown in FIG. 3, the liquid crystal display device 200 includes a liquid crystal panel 250 for realizing an image, a backlight unit 240 for supplying light to the liquid crystal panel 250, a mold frame 230 for storing the backlight unit 240, and first and second chassis 210 and 220, respectively, for forming an external shape of the liquid crystal display device 200.

The backlight unit 240 includes a reflective sheet 241, a light guide plate 242, and an optical sheet 243, wherein the light guide plate 242 guides light received from a lamp (not shown) to the liquid crystal panel 250.

The optical sheet 243 includes a diffusion sheet 243a which transmits the light emitted from the light guide plate 242 to the liquid crystal panel 250 and diffuses the light, a prism sheet 243b which converts a proceeding angle of the light so as to be perpendicular to the liquid crystal panel 250, and a protection sheet 243c which protects a surface of the prism sheet 243b.

The reflective sheet 241 is installed on a rear surface of the light guide plate 242, so as to reflect light emitted from the rear surface of the light guide plate 242 to the liquid crystal panel 250.

The liquid crystal panel 250 includes a thin film transistor substrate 251 and a color filter substrate 252, wherein a liquid crystal layer (not shown) is disposed therebetween, and polarizing plates 253 and 254 which are respectively adhered to a top of the color filter substrate 252 and a bottom of the thin film transistor substrate 251.

The mold frame 230 stores the backlight unit 240 and supports a side of the liquid crystal panel 250, and the first and second chassis 210 and 220, respectively, are installed outside the mold frame 230.

The first chassis 210 includes a bottom unit 211 for supporting the bottom of the backlight unit 240, and a side unit 212 for supporting the side of the backlight unit 240.

The second chassis 220 covers and supports the side unit 212 of the first chassis 210 and part of the top of the liquid crystal panel 250.

A hemming processor 213 is formed at the end of the side unit 212 of the first chassis 210 by bending the end of the side unit 212 inward so as to increase the thickness of the hemming processor 213. In other words, the end of the first chassis 210 is bent so as to have a double thickness via a hemming process, and thus the intensity of the end, which may be weak, may be somewhat reinforced.

Since an empty space, i.e., a gap G, may be formed between the double thickness when the hemming processor 213 is formed, the intensity reinforcing effect may be decreased, and thus, a reinforcing member 260 is disposed besides the hemming processor 213 adjacent to the gap G. In other words, by disposing the reinforcing member 260 beside the hemming processor 213, the thickness of the side unit 212 may be increased by the thickness of the reinforcing member 260, and thus, the intensity is improved more than when the gap G remains as an empty space.

Like the first and second chassis 210 and 220, respectively, the reinforcing member 260 may be formed a metal, such as aluminum.

The liquid crystal display device 200 manufactured as such may have improved intensity according to the increase in thickness by combining the side unit 212, which may be specifically weak against external shock to the hemming processor 213, and the reinforcing member 260.

Accordingly, the intensity of the end of the first chassis 210, which is hemming processed, may be improved, thereby guaranteeing strong durability against external shock.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A liquid crystal display device, comprising:
a liquid crystal panel for realizing an image;
a backlight unit for irradiating a backlight on the liquid crystal panel;
a mold frame for storing the backlight unit;

a first chassis for supporting the mold frame and comprising a hemming processor which is bent at an end of the first chassis so as to have a double thickness; and a reinforcing member installed so that a thickness of the hemming processor is increased.

2. The liquid crystal display device of claim 1, wherein the reinforcing member is inserted into a gap between a main portion and a bent portion of the bent hemming processor.

3. The liquid crystal display device of claim 2, wherein the reinforcing member comprises a same material as the first chassis.

4. The liquid crystal display device of claim 2, further comprising a second chassis partially surrounding the hemming processor of the first chassis and the liquid crystal panel.

5. The liquid crystal display device of claim 2, wherein the first chassis comprises a bottom unit for supporting the backlight unit, and a side unit perpendicularly bent from the bottom unit and comprising the hemming processor at an end, wherein the reinforcing member is installed on the side unit.

6. The liquid crystal display device of claim 5, wherein a part of the reinforcing member is disposed inside the gap of the hemming processor.

7. The liquid crystal display device of claim 1, wherein the reinforcing member is adhered to the hemming processor.

8. The liquid crystal display device of claim 7, wherein the reinforcing member comprises a same material as the first chassis.

9. The liquid crystal display device of claim 7, further comprising a second chassis partially surrounding the hemming processor of the first chassis and the liquid crystal panel.

10. The liquid crystal display device of claim 7, wherein the first chassis comprises a bottom unit for supporting the backlight unit, and a side unit perpendicularly bent from the bottom unit and comprising the hemming processor at an end, wherein the reinforcing member is installed on the side unit.

* * * * *